United States Patent
Holoweiko et al.

(10) Patent No.: US 8,985,260 B2
(45) Date of Patent: Mar. 24, 2015

(54) VEHICLE INCLUDING EXHAUST SYSTEM ATTACHED TO SUB-FRAME

(71) Applicants: Ryan J. Holoweiko, Delaware, OH (US); Travis Barkey, Dublin, OH (US)

(72) Inventors: Ryan J. Holoweiko, Delaware, OH (US); Travis Barkey, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/171,882

(22) Filed: Feb. 4, 2014

(65) Prior Publication Data

US 2014/0216843 A1 Aug. 7, 2014

Related U.S. Application Data

(60) Provisional application No. 61/761,516, filed on Feb. 6, 2013.

(51) Int. Cl.
*B60K 5/12* (2006.01)
*B60K 13/04* (2006.01)

(52) U.S. Cl.
CPC ................................ *B60K 13/04* (2013.01)
USPC ............. 180/299; 180/296; 180/61; 180/309; 180/312

(58) Field of Classification Search
USPC ................... 180/296, 309, 89.2, 312, 61, 299
See application file for complete search history.

(56) References Cited

U.S. PATENT DOCUMENTS

| | | | |
|---|---|---|---|
| 2,912,198 A | 11/1959 | Feil, Jr. | |
| 4,266,630 A | 5/1981 | Nilsson et al. | |
| 4,339,919 A | 7/1982 | Jobling et al. | |
| 4,485,999 A | 12/1984 | Isobe | |
| 4,821,827 A | 4/1989 | Reese | |
| 5,263,815 A | 11/1993 | Brenner | |
| 5,570,757 A | 11/1996 | Courtwright et al. | |
| 5,718,407 A | 2/1998 | Lee | |
| 5,823,286 A | 10/1998 | Ishihara et al. | |
| 5,845,734 A | 12/1998 | Samardzich et al. | |
| 6,085,858 A | 7/2000 | Wakana et al. | |
| 6,213,455 B1 | 4/2001 | Kato et al. | |
| 6,648,093 B2 | 11/2003 | Rioux et al. | |
| 6,651,966 B2 | 11/2003 | Hettler | |
| 6,708,793 B2 | 3/2004 | Witherspoon et al. | |

(Continued)

OTHER PUBLICATIONS

U.S. Appl. No. 14/172,103; Titled: Vehicle Including Mount Devices for Coupling a Sub-Frame with a Main Frame; filed Feb. 4, 2014; Inventors: Douglas M. Olsen et al.; in its entirety.

(Continued)

*Primary Examiner* — Hau Phan
*Assistant Examiner* — Bryan Evans
(74) *Attorney, Agent, or Firm* — Ulmer & Berne LLP

(57) ABSTRACT

A vehicle includes a frame, an engine, and an exhaust system. The frame includes a main frame and a sub-frame movably attached to the main frame. The sub-frame includes an exhaust bracket that includes a hollow collar. The engine includes an engine casing and an exhaust port. The engine is releasably attached to the sub-frame. The exhaust system includes a conduit, a conduit bracket, and a muffler. The conduit includes an upstream end and a downstream end. The upstream end is connected to the exhaust port. The conduit bracket includes a first end and a second end. The first end is attached to the conduit at a location intermediate the upstream end of the conduit and the downstream end of the conduit. The second end of the conduit bracket is movably attached to the hollow collar. The muffler is attached to the downstream end of the conduit.

20 Claims, 12 Drawing Sheets

(56) References Cited

U.S. PATENT DOCUMENTS

| | | |
|---|---|---|
| 6,722,463 B1 | 4/2004 | Reese |
| 6,758,300 B2 | 7/2004 | Kromis et al. |
| 6,983,728 B1 | 1/2006 | Banks, Jr. et al. |
| 7,032,701 B2 | 4/2006 | Yoshida et al. |
| 7,108,098 B2 | 9/2006 | Reese et al. |
| 7,413,050 B2 | 8/2008 | Miyagawa et al. |
| 7,490,691 B2 | 2/2009 | Reese et al. |
| 7,510,043 B2 | 3/2009 | Cerri, III |
| 7,597,173 B2 | 10/2009 | Kappich et al. |
| 7,644,911 B2 | 1/2010 | Rodecker |
| 7,669,687 B2 | 3/2010 | Takahashi et al. |
| 7,694,769 B2 | 4/2010 | McGuire |
| 7,708,103 B2 | 5/2010 | Okuyama et al. |
| 7,878,285 B2 * | 2/2011 | Oda et al. ............... 180/296 |
| 8,042,793 B2 | 10/2011 | Igami |
| 8,066,266 B2 | 11/2011 | Rodecker |
| 8,152,146 B2 | 4/2012 | Rodecker |
| 8,308,193 B2 | 11/2012 | Lux et al. |
| 8,376,331 B2 | 2/2013 | Rodecker |
| 2002/0029920 A1 | 3/2002 | Fournier et al. |
| 2006/0000658 A1 | 1/2006 | Reese et al. |
| 2007/0210497 A1 * | 9/2007 | Furman et al. ........... 267/140.13 |
| 2008/0029942 A1 | 2/2008 | Kern |
| 2008/0142289 A1 | 6/2008 | Yang et al. |
| 2011/0290579 A1 | 12/2011 | Muto et al. |
| 2012/0118660 A1 | 5/2012 | Tamura |

OTHER PUBLICATIONS

Vanaman, Frank Bennett; Non-Final Office Action issued in U.S. Appl. No. 14/172,103; Titled: Vehicle Including Mount Devices for Coupling a Sub-Frame with a Main Frame; Filed: Feb. 4, 2014; Inventor(s): Douglas M. Olsen et al.; 11 pages.

* cited by examiner

VEHICLE INCLUDING EXHAUST SYSTEM ATTACHED TO SUB-FRAME

REFERENCE TO RELATED APPLICATION

This application claims priority of U.S. provisional patent application Ser. No. 61/761,516, filed Feb. 6, 2013, and hereby incorporates this provisional patent application by reference herein in its entirety.

TECHNICAL FIELD

A vehicle includes a vehicular frame and a utility bed. The utility bed is coupled with the vehicular frame and includes a left rear seat and a right rear seat.

BACKGROUND

Certain conventional vehicles include a utility bed which is movable between a hauling position and a dumping position. Such a utility bed is often referred to as a "dump bed" and is suitable to selectively facilitate transportation of cargo.

SUMMARY

In accordance with one embodiment, a vehicle comprises a frame, an engine, and an exhaust system. The frame comprises a main frame and a sub-frame movably attached to the main frame. The sub-frame comprises an exhaust bracket that comprises a hollow collar. The engine comprises an engine casing and an exhaust port. The engine is releasably attached to the sub-frame. The exhaust system comprises a conduit, a conduit bracket, and a muffler. The conduit comprises an upstream end and a downstream end. The upstream end is connected to the exhaust port. The conduit bracket comprises a first end and a second end. The first end is attached to the conduit at a location intermediate the upstream end of the conduit and the downstream end of the conduit. The second end of the conduit bracket is movably attached to the hollow collar. The muffler is attached to the downstream end of the conduit.

In accordance with another embodiment, a vehicle comprises a frame, an engine, and an exhaust system. The frame comprises a main frame and a sub-frame movably attached to the main frame and movable relative to the main frame in three mutually orthogonal directions. The sub-frame comprises an exhaust bracket that comprises a hollow collar. The engine comprises an engine casing and an exhaust port. The engine casing comprises a first mount lug and a second mount lug. Each of the first mount lug and the second mount lug is releasably fastened to the sub-frame. The exhaust system comprises a conduit, a conduit bracket, and a muffler. The conduit comprises an upstream end and a downstream end. The upstream end is connected to the exhaust port. The conduit bracket comprises a first end and a second end. The first end is attached to the conduit at a location intermediate the upstream end of the conduit and the downstream end of the conduit. The second end of the conduit bracket is movably attached to the hollow collar to permit movement of the conduit bracket relative to the sub-frame. The muffler is attached to the downstream end of the conduit.

BRIEF DESCRIPTION OF THE DRAWINGS

Various embodiments will become better understood with regard to the following description, appended claims and accompanying drawings wherein:

DETAILED DESCRIPTION

Embodiments are hereinafter described in detail in connection with the views of FIGS. 1-13, wherein like numbers indicate the same or corresponding elements throughout the views. A utility vehicle includes a utility bed which can be used to facilitate hauling of cargo by the utility vehicle. In one embodiment, the utility vehicle can be a dump-type utility vehicle having a utility bed that can facilitate selective dumping of cargo from the utility bed. A dump-type utility vehicle can comprise a light utility vehicle, such as the utility vehicle 10 shown in FIGS. 1-13. In other embodiments, a dump-type utility vehicle can comprise any of a variety of other types of utility vehicles having a utility bed capable of dumping (e.g., a dump bed) such as, for example, a pickup truck, a dump truck, an all-terrain vehicle ("ATV"), a golf cart, and other similar vehicles, for example. In another embodiment, the utility vehicle can include a non-dump type utility vehicle having a utility bed that is rigidly fixed to the utility vehicle's frame (e.g., a non-dumpable bed). In yet another embodiment, the utility vehicle can include a trailer.

Figure 1:
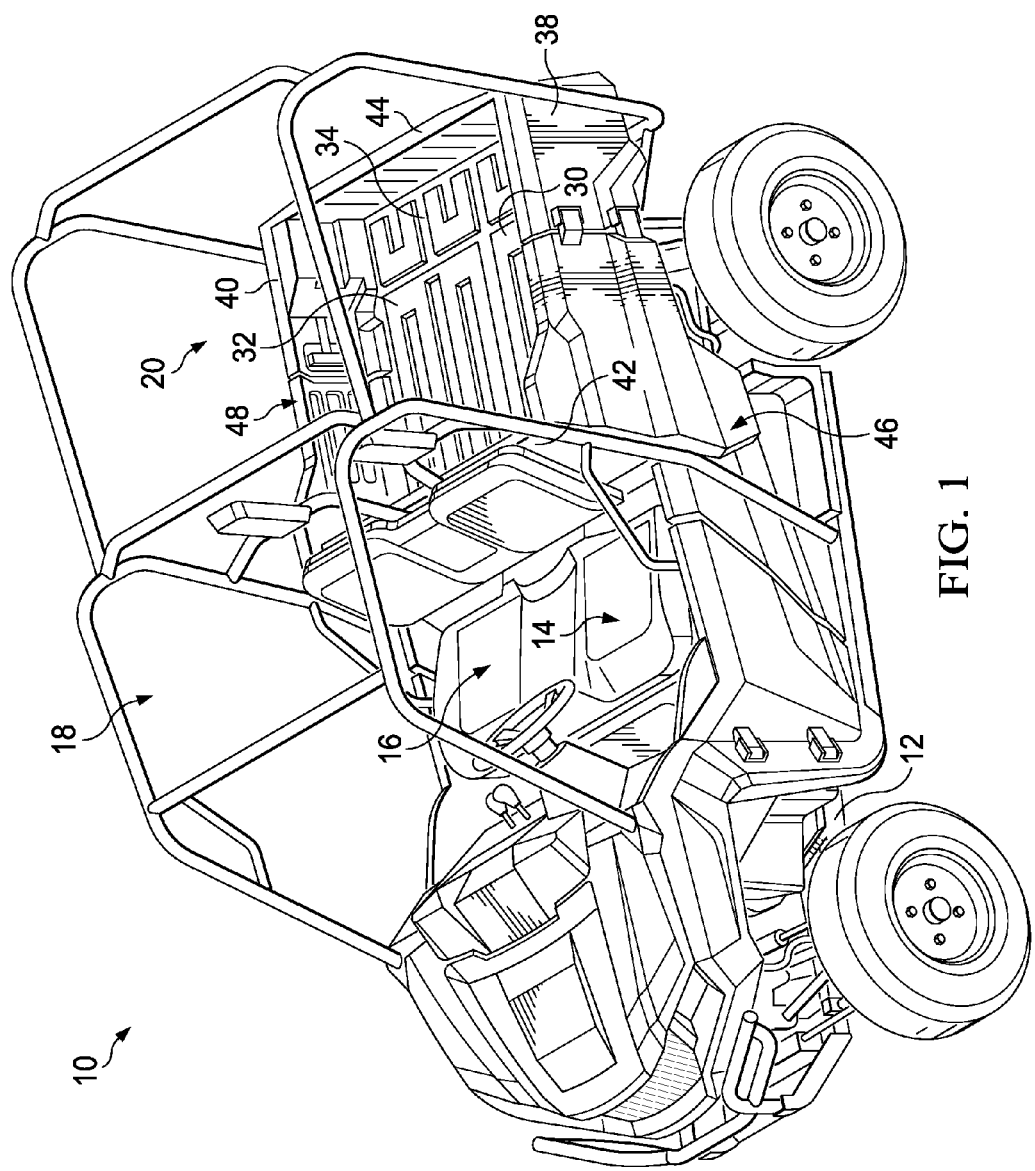
FIG. 1 is a left side perspective view depicting a vehicle having a utility bed that includes left and right rear seats in respective stowed positions, in accordance with one embodiment.

Referring to FIG. 1, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum). A left front seat 14 and a right front seat 16 can each be supported by the vehicular frame 12 and can facilitate support of occupants within a passenger compartment 18. The utility vehicle 10 can also include a utility bed 20 which is coupled with the vehicular frame 12, either directly or indirectly, and such as through use of a hinge assembly (not shown). The hinge assembly can facilitate pivotable movement of the utility bed 20 with respect to the vehicular frame 12, and between a hauling position (shown in FIG. 1) and a dumping position (not shown).

Figure 2:
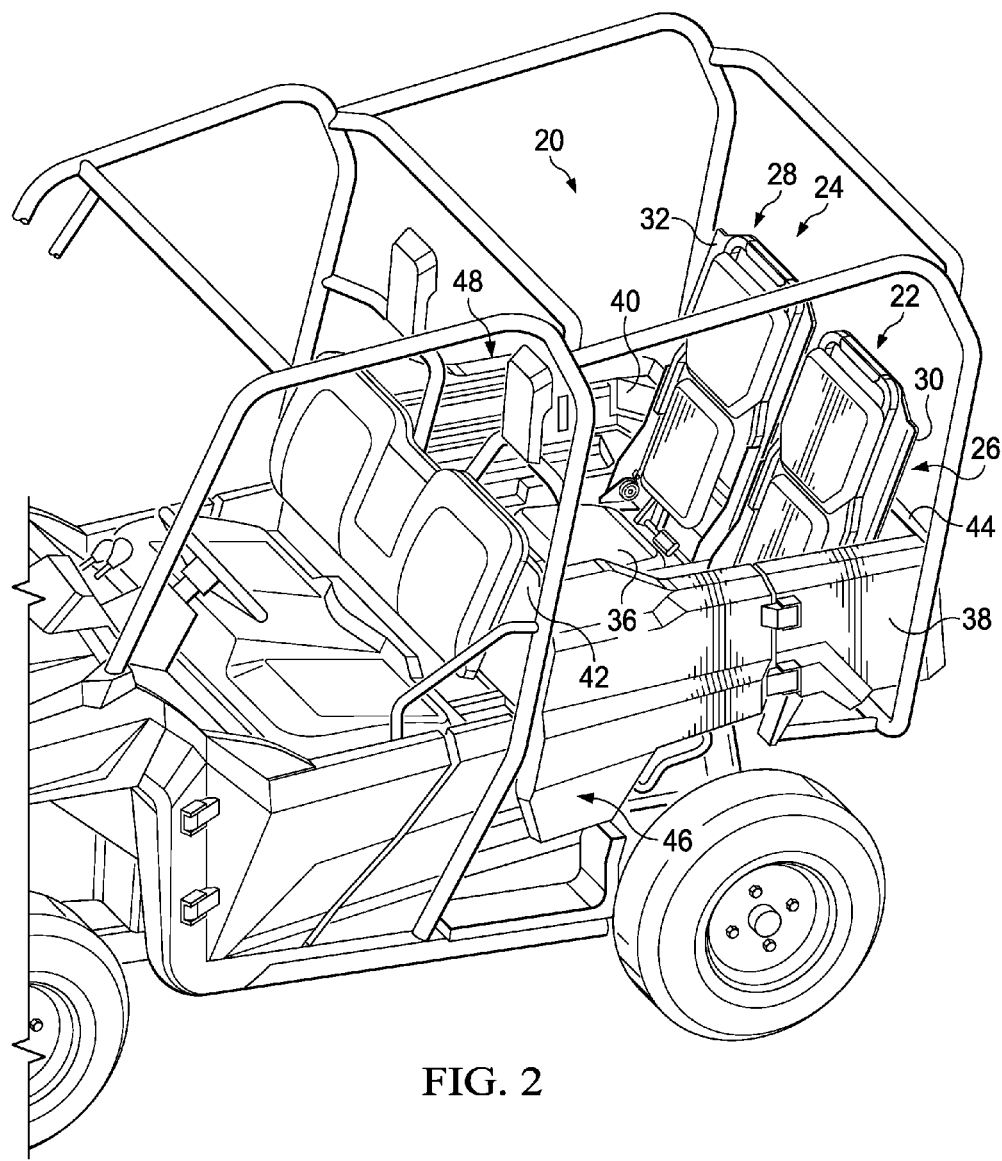
FIG. 2 is a left side perspective view depicting a portion of the vehicle of FIG. 1 but with the left and right rear seats in respective deployed positions.

As illustrated in FIG. 2, the utility bed 20 can include a left rear seat 22 and a right rear seat 24 that can include a left seat back 26 and a right seat back 28, respectively. Each of the left and right seat backs 26, 28 can be selectively and independently pivotable about a pivot axis (A1 in FIG. 3) between a stowed position (FIG. 1) and a deployed position (FIG. 2). When the left and right seat backs 26, 28 are in their stowed positions, their respective cover panels 30, 32 can facilitate support of cargo within the utility bed 20. For example, the utility bed 20 is shown to comprise a bed floor 34 (FIG. 1) adjacent to the left and right rear seats 22, 24. When the left and right seat backs 26, 28 are in their respective stowed positions, the left and right cover panels 30, 32 can cooperate with the bed floor 34 to define a cargo support surface for the utility bed 20. When the left and right seat backs 26, 28 are in their deployed positions, the left and right seat backs 26, 28 can cooperate with respective left and right seat bottoms (e.g., 36 and 37 in FIG. 3) to facilitate support of passengers behind the left front seat 14 and the right front seat 16, respectively. The right and left seat bottoms 36, 37 can include respective cushions for providing underlying support to a seated passenger.

The utility bed 20 is shown to include a left side wall 38 and a right side wall 40 extending generally perpendicularly from the bed floor 34 or locations adjacent to the bed floor 34. The utility bed 20 is also shown to include a front wall 42 and a tailgate 44. The tailgate 44 can be pivotally coupled with respect to the bed floor 34. When the utility bed 20 is in the hauling position (shown in FIG. 1), the left side wall 38, the right side wall 40, and the front wall 42 can cooperate with the bed floor 34 to retain cargo within the utility bed 20. The tailgate 44, when closed (as shown in FIGS. 1 and 2), can also cooperate with the left side wall 38, the right side wall 40, and the bed floor 34 to retain cargo within the utility bed 20. It will be appreciated that the tailgate 44 can be selectively opened to facilitate loading of the utility bed 20 and/or to allow cargo (e.g., dirt) to pour from the utility bed 20 when the utility bed 20 is in a dumping position (not shown). In another embodiment, it will be appreciated that a rear wall can be provided in lieu of a tailgate, with the rear wall being rigidly affixed with respect to a bed floor of a utility bed such that it might not be capable of being selectively opened by an operator. In yet another alternative embodiment, it will be appreciated that one or more side walls (e.g., 38 and/or 40) of a utility bed might be capable of being selectively opened (e.g., like tailgate 44) by an operator. In still another alternative embodiment, it will be appreciated that a utility bed might not include any tailgate and/or side walls and might, for example, comprise a flat-bed type configuration.

Figure 3:
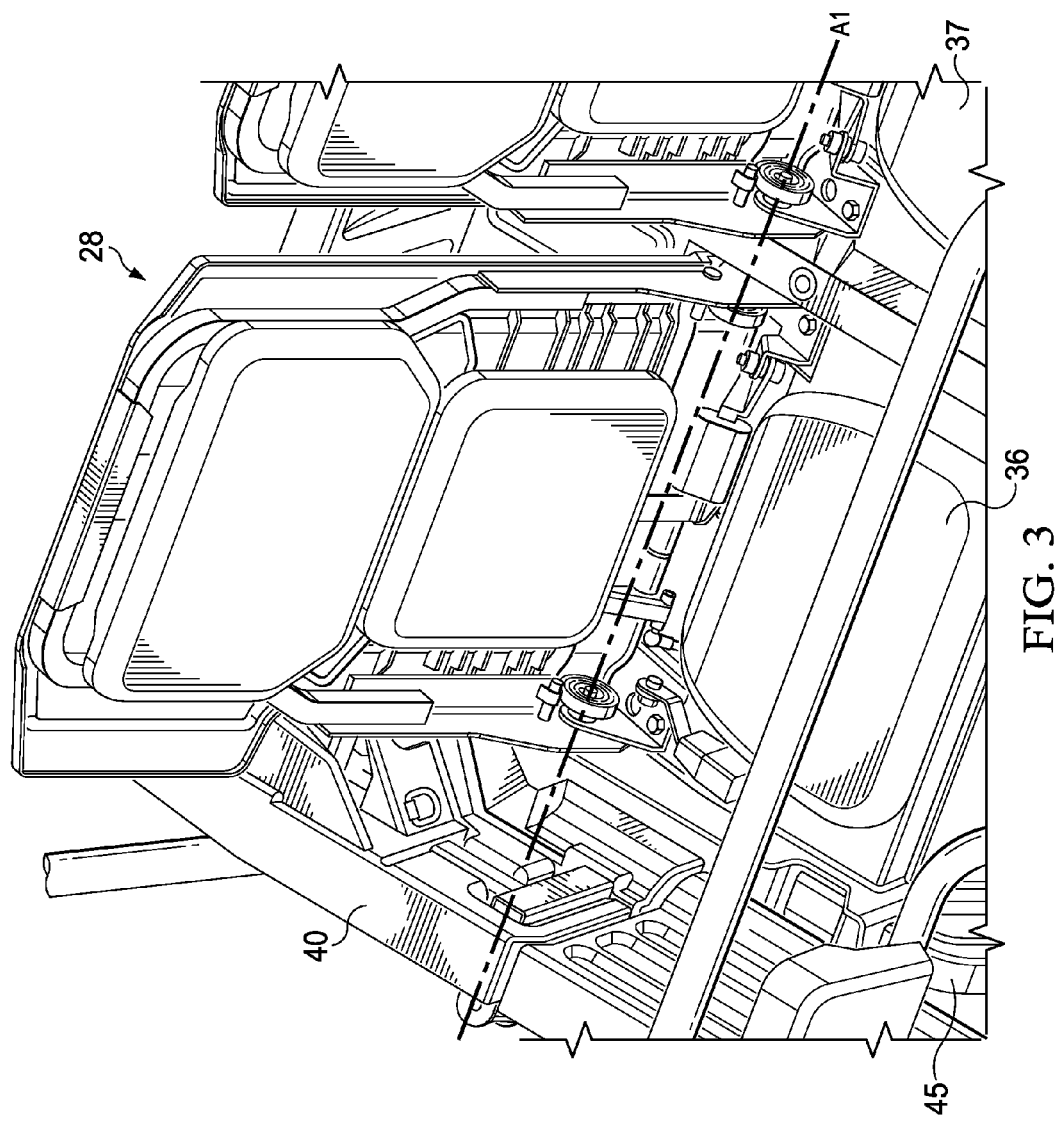
FIG. 3 is an enlarged view depicting a portion of the vehicle of FIG. 2, including the right rear seat.

As illustrated in FIG. 3, the utility bed 20 can include a bed frame 45 that is configured to provide underlying and structural support for certain components of the utility bed 20. The bed frame 45 can comprise a tubular frame structure that extends along a perimeter and/or underneath the bed floor 34 and provides underlying support for the bed floor 34, the left and right side walls 38, 40, and/or the front wall 42.

The utility bed 20 is also shown in FIG. 2 to include respective left and right doors 46, 48 which are each pivotable between a closed position (shown in FIGS. 1 and 2) and an opened position (not shown). When in the closed position, each of the left and right doors 46, 48 can cooperate with the respective left and right side walls 38, 40, the front wall 42, and the bed floor 34 to retain cargo within the utility bed 20. When the left and right doors 46, 48 are moved to the respective opened positions, a passenger can be permitted ingress/egress to/from the left and right rear seats 22, 24.

In one embodiment, the left and right doors 46, 48 can comprise rear-hinged doors that are pivotally attached to the left and right side walls 38, 40, respectively, such that the left and right doors 46, 48 can be selectively opened towards a rear of the utility bed 20. Opening the left and right doors 46, 48 towards the rear of the utility bed 20 can permit more direct access to the left and right rear seats 22, 24 than might be otherwise be available with front-hinged doors. It will be appreciated, however, that in certain alternative embodiments, the left and right doors 46, 48 can instead be front-hinged doors or any of a variety of suitable alternate door arrangements.

Each of the left and right doors 46, 48 can include respective left and right door latches (not shown) that can selectively interact with the front wall 42 to facilitate releasable coupling of the left and right doors 46, 48 in their closed positions. The latches can be selectively activated through operation of a door actuator (not shown) to facilitate opening of the left and right doors 46, 48. In one embodiment, a seal (not shown) can be provided along the perimeter of each of the left and right doors 46, 48. Each seal can facilitate selective sealing of the interaction between the door (e.g., 46, 48) and the adjacent side wall (e.g., 38, 40).

Figure 4:
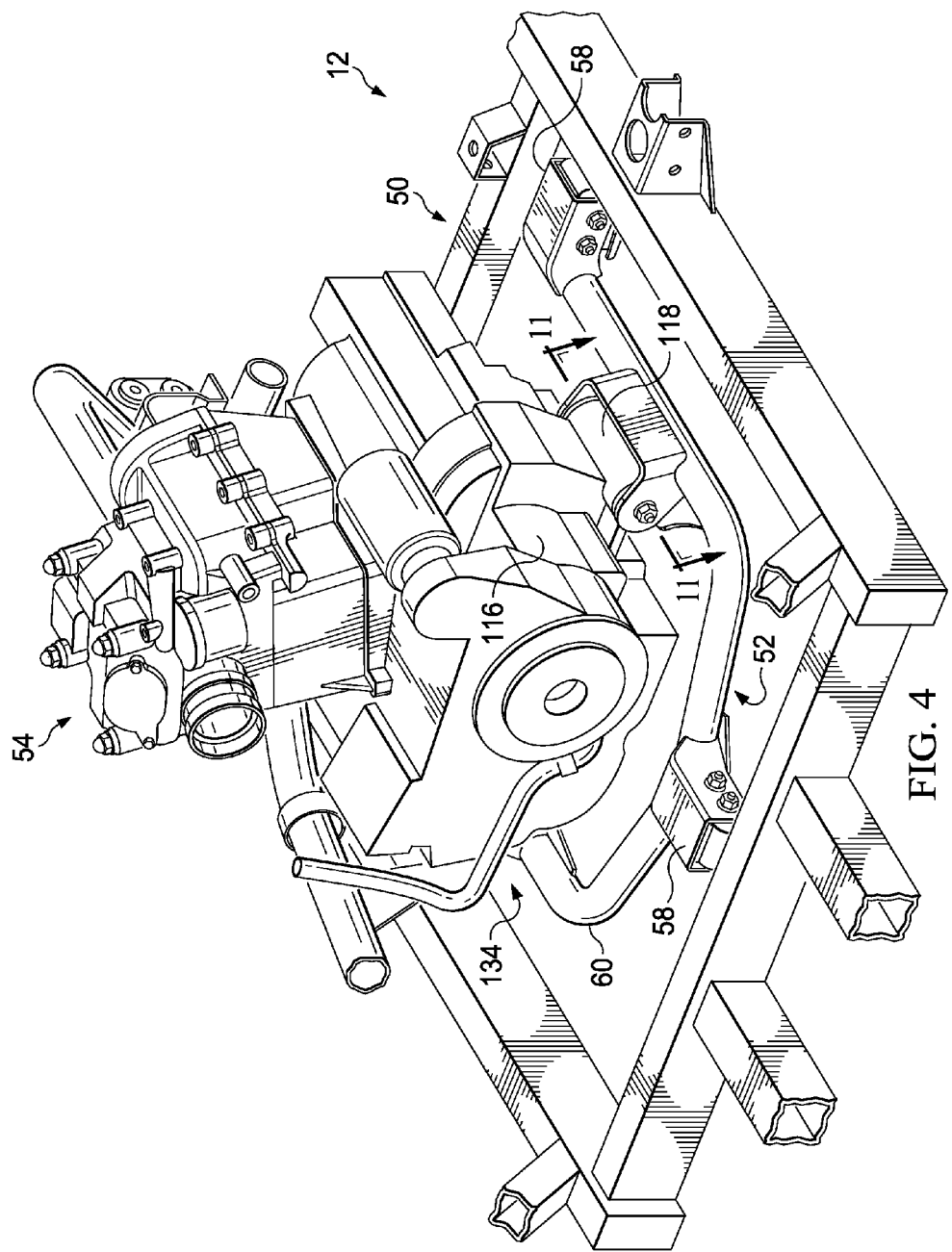
FIG. 4 is an enlarged view depicting an engine, a sub-frame, and a portion of a vehicular frame together with certain other components of the vehicle of FIG. 1.
Figure 5:
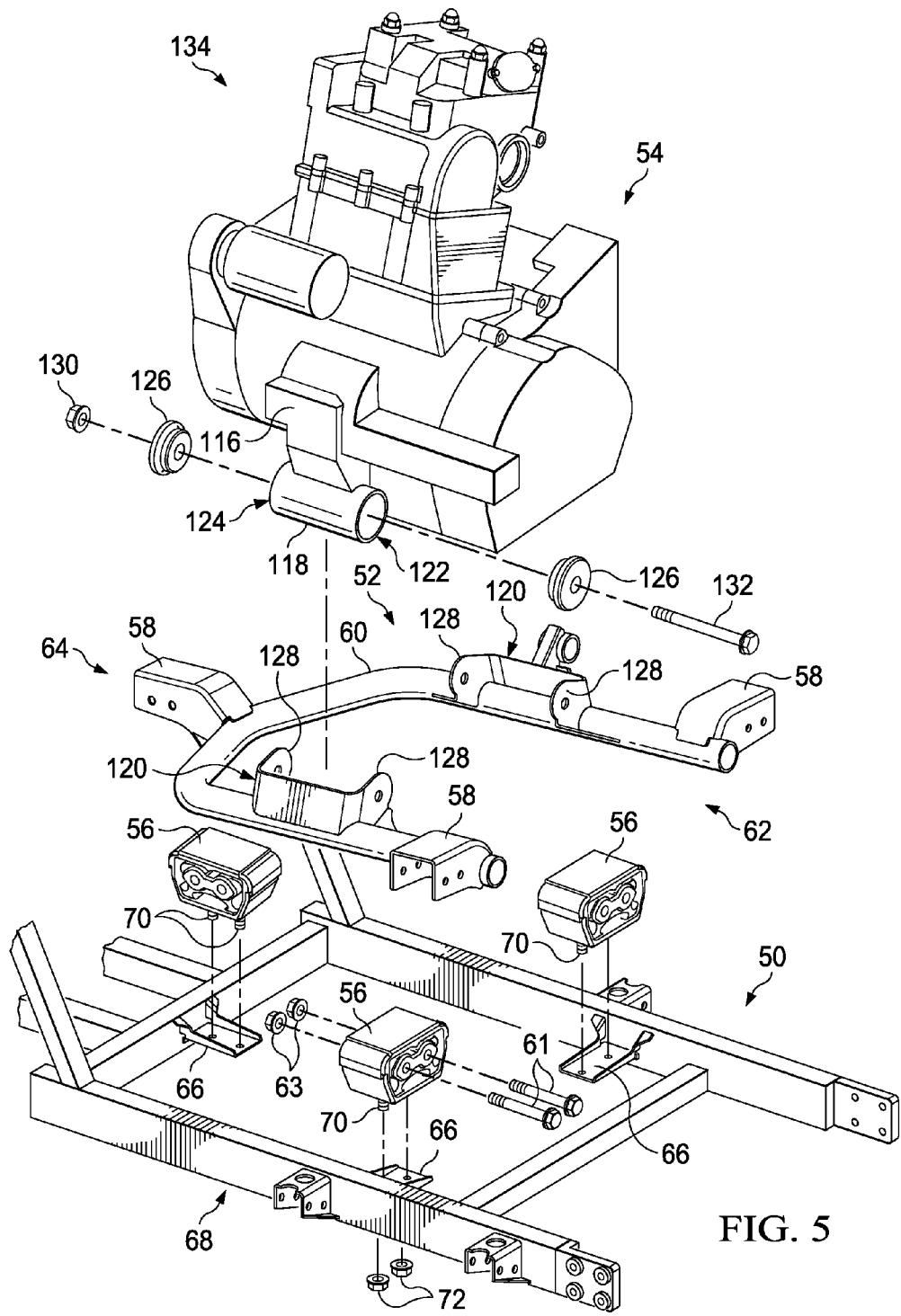
FIG. 5 is an exploded view depicting the arrangement of FIG. 4 including a plurality of mount devices.

Referring now to FIGS. 4 and 5, the vehicular frame 12 can include a main frame 50 and a sub-frame 52. As will be described in further detail below, the sub-frame 52 can be attached to the main frame 50 and can support an engine 54 with respect to the main frame 50. In one embodiment, the engine 54 can comprise an internal combustion engine, or in other embodiments, an engine can comprise any of a variety of suitable alternative sources of motive power, such as an electric motor or a pneumatic motor, for example.

The sub-frame 52 can be coupled with the main frame 50 with a plurality (e.g., three) of mount devices 56 (FIG. 5). Each of the mount devices 56 can be received within a respective receptacle 58 of the sub-frame 52 and can be releasably attached thereto with respective bolts (e.g., 61) and nuts (e.g., 63). Each of the receptacles 58 can be attached to a tubular member 60 of the sub-frame 52 such as through welding, for example. The tubular member 60 is shown to be substantially U-shaped and comprises a front end 62 and a rear end 64. Two of the receptacles 58 are shown to be located at the front end 62 and one of the receptacles 58 is shown be substantially centrally located at the rear end 64. The receptacle 58 located at the rear end 64 can extend away from the tubular member 60 such that the overall shape of the sub-frame 52 is generally forked or Y-shaped.

The main frame 50 is shown to include a plurality of support brackets 66 that are configured to provide underlying support for the mount devices 56. Each of the support brackets 66 can extend inwardly with respect to a base portion 68 of the main frame 50. Each of the receptacles 58 can extend away from the tubular member 60 such that they are substantially aligned with the support brackets 66. In this arrangement, when the sub-frame 52 is coupled with the main frame 50, the sub-frame 52 can be disposed laterally within the base portion 68 of the sub-frame 52. Each of the mount devices 56 can be releasably coupled with the support brackets 66. In one embodiment, as illustrated in FIGS. 5 and 6, each of the mount devices 56 can include a pair of male fasteners 70 that are configured to extend through respective ones of the support brackets 66 and secured thereto with nuts (e.g., 72 in FIG. 5).

Figure 6:
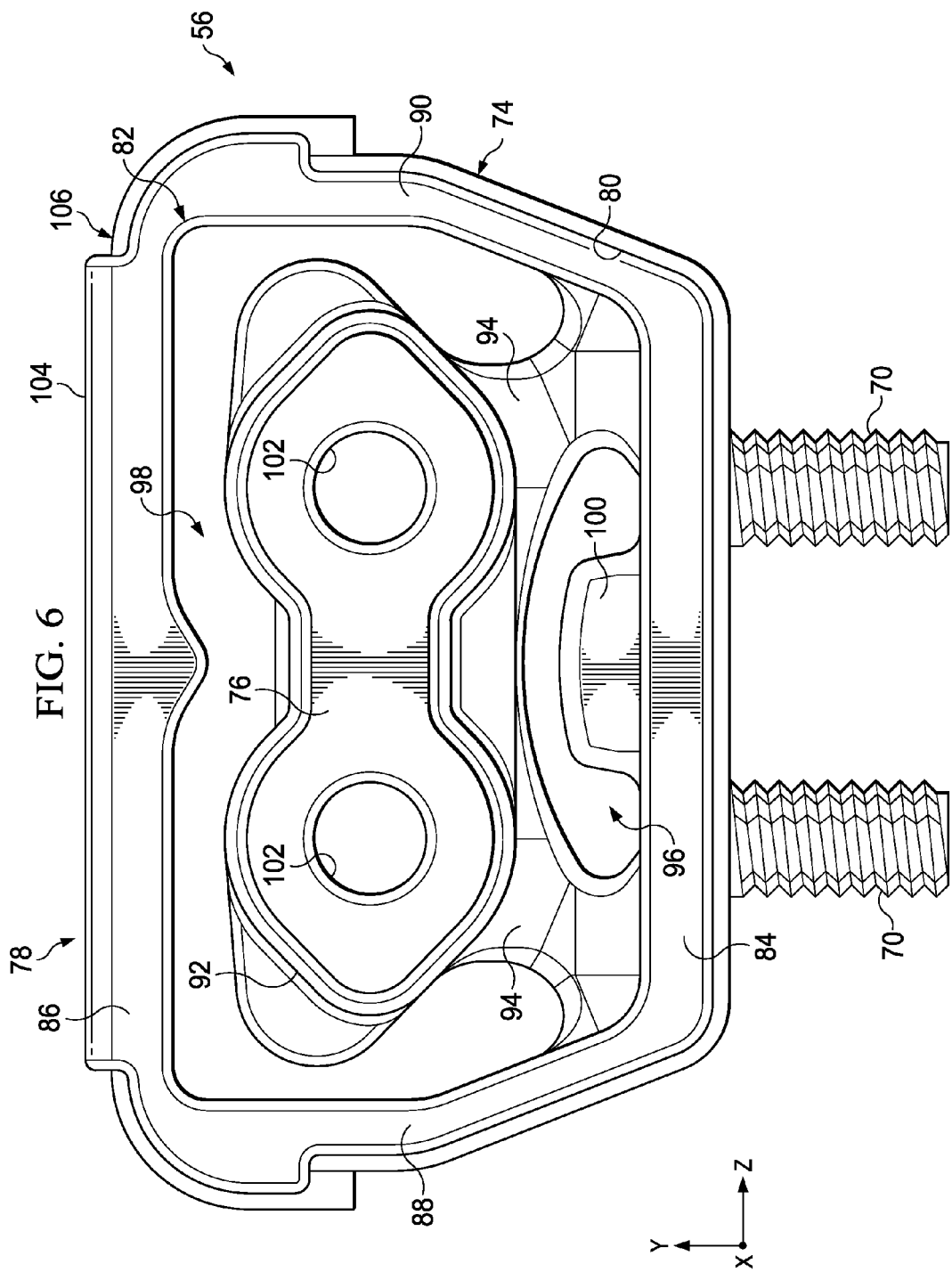
FIG. 6 is a side perspective view of one of the mount devices of FIG. 5.
Figure 7:
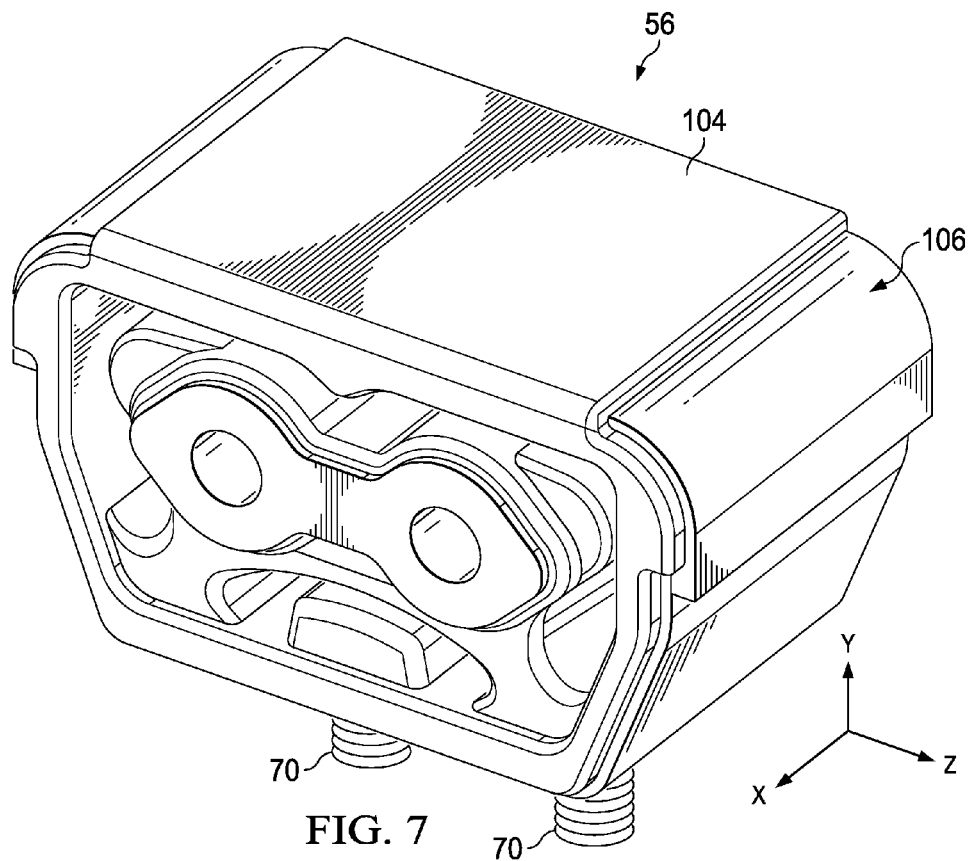
FIG. 7 is an upper side perspective view of the mount device of FIG. 6.

Referring now to FIGS. 6 and 7, one of the mount devices 56 is shown. It will be appreciated that each of the mount devices 56 shown in FIG. 5 can be similar to, or the same in many respects as, the mount device 56 shown in FIGS. 6 and 7 and described herein. The mount device 56 can include a casing 74, a core member 76, and an elastomeric member 78. The casing 74 can define an interior cavity 80 and the core member 76 can be positioned within the interior cavity 80. At least a portion of the elastomeric member 78 can be positioned within the interior cavity 80 in surrounding relationship with the core member 76.

Figure 8:
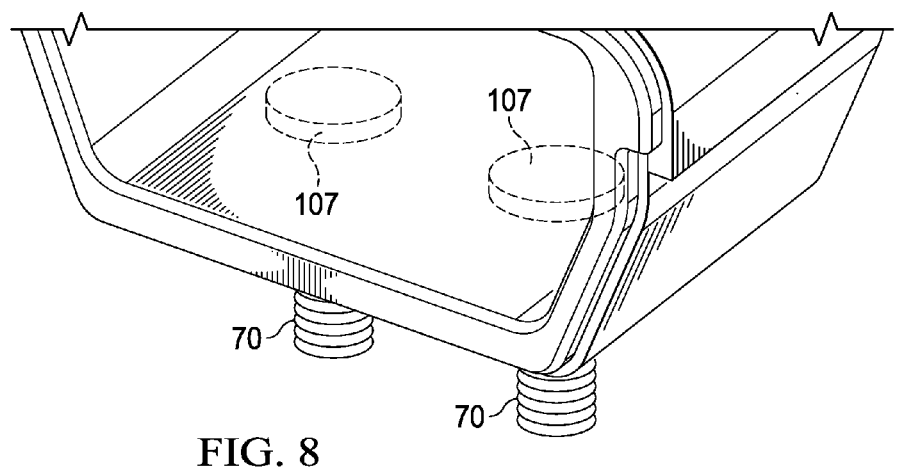
FIG. 8 is a partial lower side perspective view of the mount device of FIG. 6 but with certain components removed for clarity of illustration.

As illustrated in FIG. 6, the elastomeric member 78 can include a perimeter portion 82 that is in a contacting relationship with the casing 74. The perimeter portion 82 can include a lower perimeter portion 84, an upper perimeter portion 86, and a pair of side perimeter portions 88, 90. The elastomeric member 78 can additionally include a central portion 92 that is supported with respect to the lower perimeter portion 84 and side perimeter portions 88, 90 by a pair of legs 94. The elastomeric member 78 is shown to separate the interior cavity 80 of the casing 74 into a lower cavity 96 and an upper cavity 98. In particular, the lower perimeter portion 84, the central portion 92, and the legs 94 can cooperate to define the lower cavity 96. The upper perimeter portion 86, the side perimeter portion 88, 90, the central portion 92, and the legs 94 can cooperate to define the upper cavity 98. The perimeter portion 82 can also include a lower protrusion 100 that extends upwardly from the lower perimeter portion 84 and into the lower cavity 96. The elastomeric member 78 can also include an upper external portion 104 that covers an upper portion 106 of the casing 74. In one embodiment, the elastomeric member 78 can be formed from rubber (e.g., having a durometer value of about A52), but in other embodiments, can be formed from any of a variety of suitable alternative elastomeric materials. As illustrated in FIG. 8, each of the male fasteners 70 comprises a head 107 positioned within the interior cavity 80 and extending through the casing 74.

The core member 76 can define a pair of bolt holes 102 that are configured to receive the bolts (e.g., 61 in FIG. 5) for attachment of the core member 76, and thus the mount device 56, to one of the receptacles 58. In one embodiment, the core member 76 can be formed of extruded aluminum, but in other embodiments can be formed from a variety of suitable alternative rigid or semi rigid materials, such as steel, for example.

Figure 9:
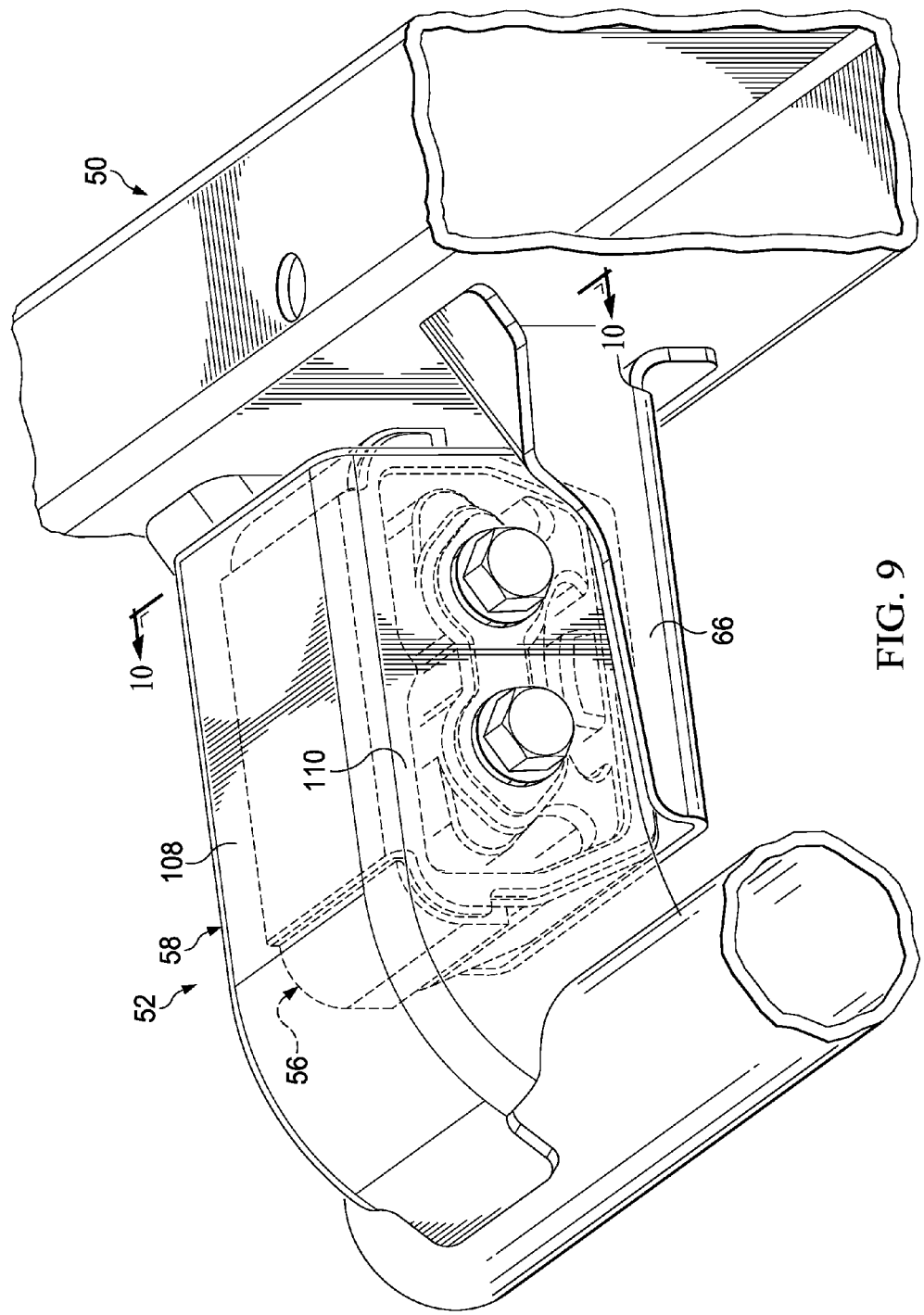
FIG. 9 is an enlarged perspective view of the mount device of FIG. 6 shown with a portion in phantom and installed between a sub-frame and a main frame.

When the mount device 56 is installed between the main frame 50 and the sub-frame 52, as illustrated in FIG. 9, the casing 74 can be attached to the main frame 50 and the core member 76 can be attached to the sub-frame 52 such that the casing 74 moves together with the main frame 50 and the core member 76 moves together with the sub-frame 52. In one embodiment, each of the casing 74 and the core member 76 can be rigidly coupled to the main frame 50 and the sub-frame 52, respectively.

The core member 76 can be movable within the interior cavity 80 relative to the casing 74, in each of three mutually orthogonal directions (e.g., shown as orthogonal axes X, Y, Z, as shown in FIGS. 6 and 7) which can facilitate movement of the sub-frame 52 relative to the main frame 50 in the three mutually orthogonal directions. When vibration (e.g., high frequency and low frequency vibration) is imparted to the sub-frame 52, the relative movement of the core member 76 with respect to the casing 74 can facilitate attenuation of the vibration with respect to the main frame 50 which can enhance a riding experience of an operator.

Figure 10:
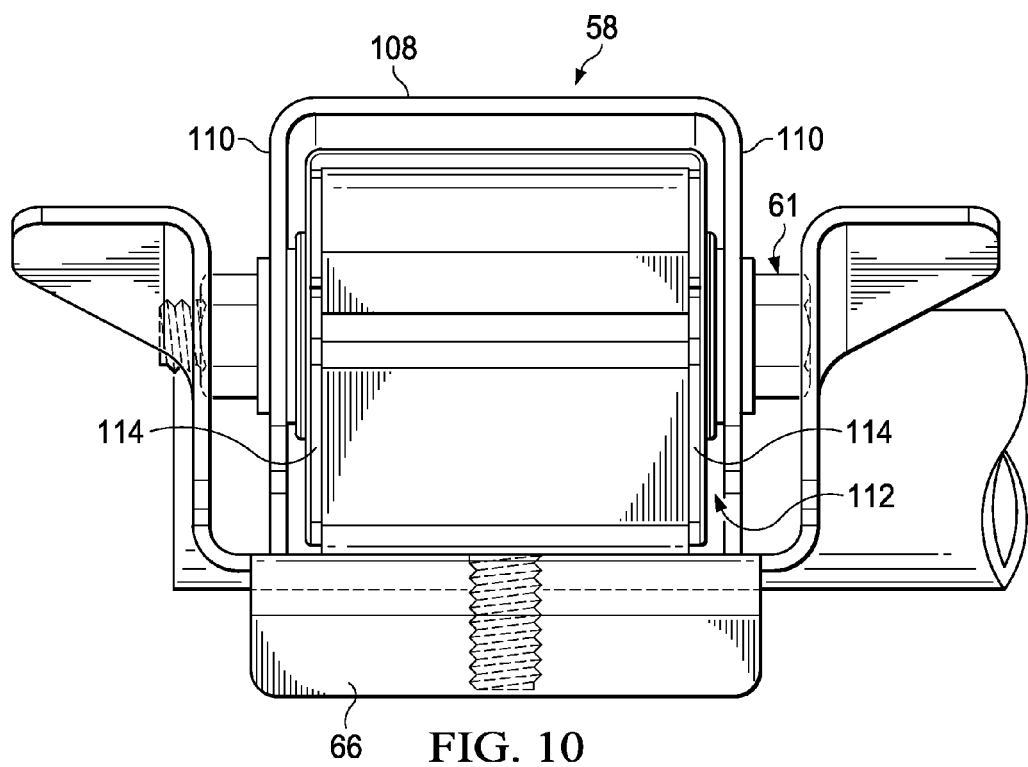
FIG. 10 is a cross-sectional view taken along the line 10-10 in FIG. 9.

Referring now to FIGS. 9 and 10, the installation of one of the mount devices 56 to one of the receptacles 58 and support brackets 66 is shown. It will be appreciated that installation of the mount devices 56 at the other receptacles 58 can be similar to, or the same in many respects as what is shown in FIGS. 9 and 10 and described herein. The receptacle 58 of the sub-frame 52 comprises an upper wall 108 and a pair of side walls 110 that are spaced apart from one another. The pair of side walls 110 can extend away from the upper wall 108 and can cooperate with the upper wall 108 to define a channel 112. The mount device 56 can be received within the channel 112 and the core member 76 can be fastened to each of the side walls 110 with bolts (e.g., 61).

When the sub-frame 52 moves relative to the main frame 50, the mount device 56 and the receptacle 58 can cooperate with each other to prevent the sub-frame 52 from moving in each of the three mutually orthogonal directions in a manner that could compromise the integrity of the mount device 56. For example, the side walls 110 of the receptacle 58 can limit the movement of the sub-frame 52 along the X-axis. Moreover, the sub-frame 52 is permitted to move upwardly along the Y-axis until the central portion 92 contacts the upper perimeter portion 86 and the upper external portion 104 of the elastomeric member 78 contacts the upper wall 108. The sub-frame 52 is permitted to move downwardly along the Y-axis until the central portion 92 contacts the lower protrusion 100. The sub-frame 52 is permitted to move along the Z-axis until the central portion 92 contacts either of the side perimeter portions 88, 90 of the elastomeric member 78. It will be appreciated that, the upper external portion 104 of the elastomeric member 78 can dampen the upper portion 106 of the mount device 56 against the upper wall 108 of the receptacle 58. It will also be appreciated that the elastomeric member 78 can extend over outer edges 114 (FIG. 10) of the casing 74 to dampen the casing 74 against the side walls 110.

It will also be appreciated that although the embodiment of FIGS. 1-10 illustrates three receptacles 58 and three corresponding mount devices 56, it will be appreciated that two receptacles and corresponding mount devices or more than three receptacles and corresponding mount devices are contemplated.

Figure 11:
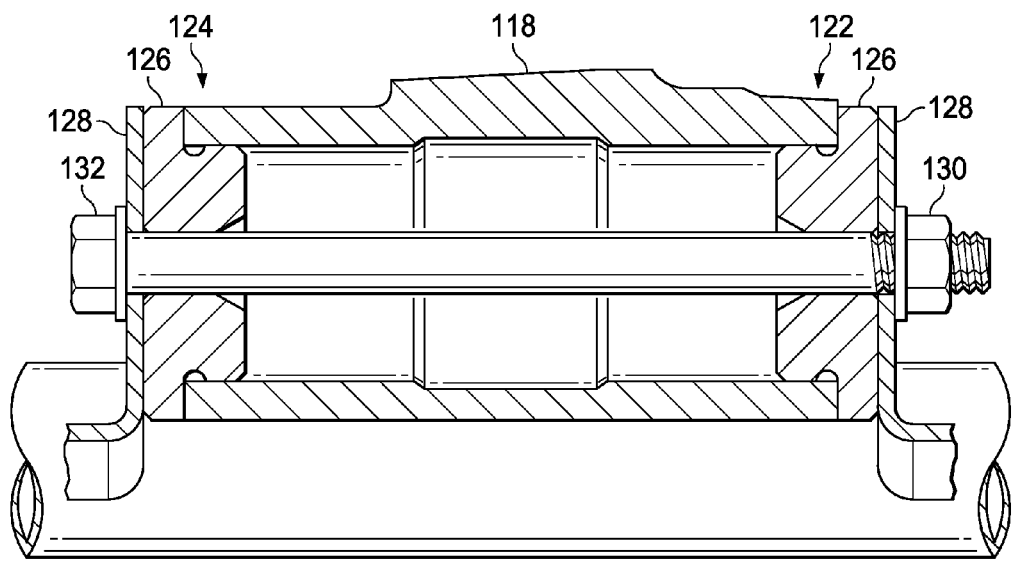
FIG. 11 is a cross-sectional view taken along the line 11-11 in FIG. 4.

Referring again to FIGS. 4 and 5, the engine 54 can be fixedly attached to the sub-frame 52. In one embodiment, the engine 54 can include a casing 116 having a pair of mount lugs 118. Each of the mount lugs 118 can be fastened to a respective engine mount bracket 120 attached to the tubular member 60 of the sub-frame 52. Each of the mount lugs 118 can be hollow. One of the mount lugs 118 is illustrated in FIG. 11 and is shown to be hollow and to include a first end 122 and a second end 124. Respective mount collars 126 can be inserted into the first and second ends 122, 124. The mount lug 118 can be disposed between opposing flanges 128 of the engine mount bracket 120 and secured thereto with a nut 130 and a bolt 132. The nut 130 and bolt 132 can be tightened enough to urge the opposing flanges 128 together enough to seat the engine mount collars 126 into each of the respective first and second ends 122, 124 of the mount lug 118. It will be appreciated that the other mount lug 118 is configured similar to, or the same in respects, to the mount lug 118 of FIG. 11.

The engine 54 is shown in FIGS. 4 and 5 to include a rear end 134. Each of the receptacles 58 are shown to be located on the tubular member 60 such that one of the receptacles 58 and corresponding mount devices 56 are positioned proximate one of the mount lugs 118, one of the receptacles 58 and corresponding mount devices 56 are positioned proximate the other of the mount lugs 118, and the other of the receptacles 58 and corresponding mount devices 56 are positioned proximate the rear end 134 of the engine 54.

Figure 12:
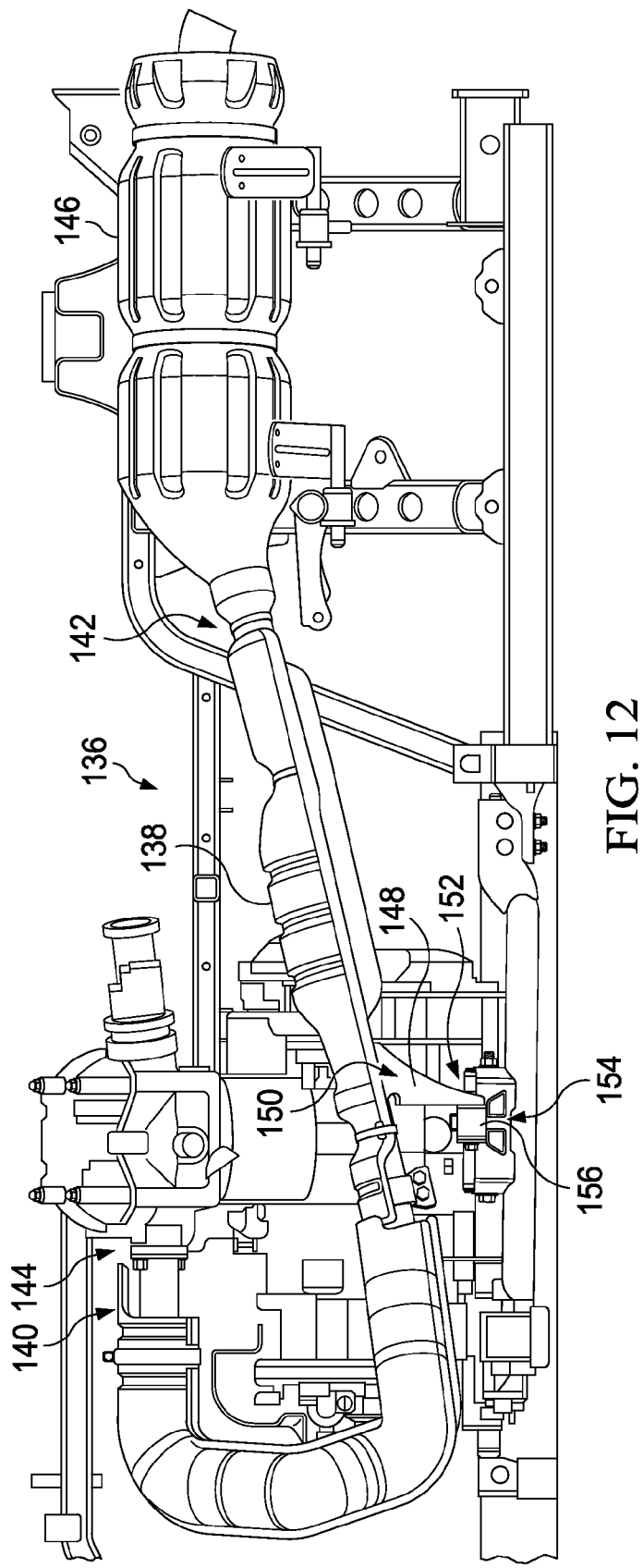
FIG. 12 is a side perspective view depicting the arrangement of FIG. 4.

Referring now to FIG. 12, the engine 54 can include an exhaust system 136. The exhaust system 136 can include a conduit 138 that comprises an upstream end 140 and a downstream end 142. The upstream end 140 can be connected to an exhaust port 144 of the engine 54. The downstream end 142 can be attached to a muffler 146. The exhaust system 136 can further include a conduit bracket 148 that is configured to couple the conduit 138 to the sub-frame 52. The conduit bracket 148 is shown to include an upper end 150 and a lower end 152. The upper end 150 can be attached to the conduit 138 at a location that is intermediate the upstream and downstream ends 140, 142 of the conduit 138. In one embodiment, the upper end 150 can be attached to the conduit 138 about midway between the upstream and downstream ends 140, 142 of the conduit 138.

Figure 13:
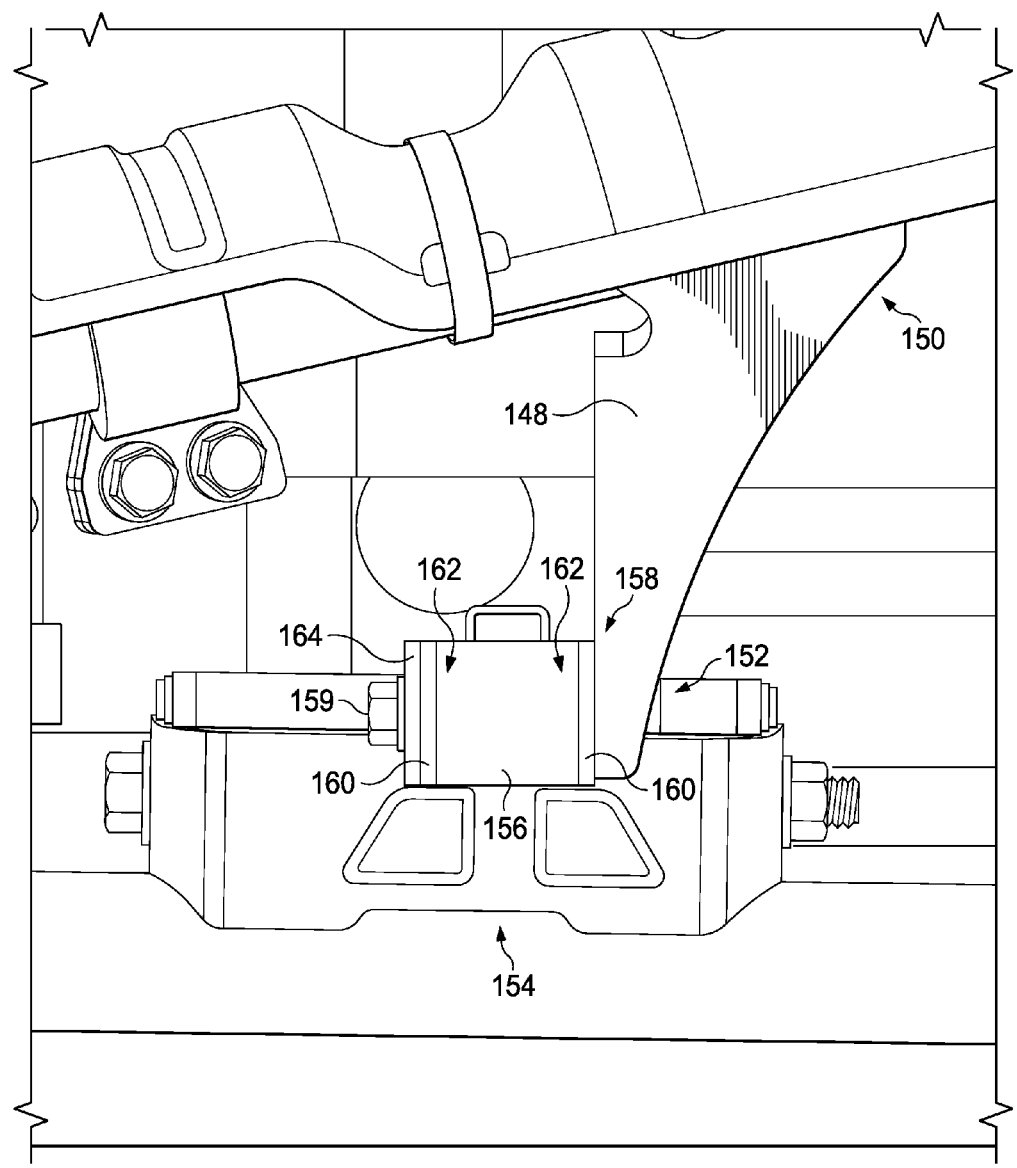
FIG. 13 is an enlarged view of the arrangement of FIG. 12.

The lower end 152 of the conduit bracket 148 can be attached to the sub-frame 52. As illustrated in FIGS. 12 and 13, the sub-frame 52 comprises a muffler support bracket 154 that is located adjacent to one of the engine mount brackets 120. The muffler support bracket 154 can include a hollow collar 156 and a grommet 158 disposed within the hollow collar 156. A bolt 159 can extend through the grommet 158 and a nut (not shown) can be threaded thereon to facilitate securement of the lower end 152 of the conduit bracket 148 to the hollow collar 156.

In one embodiment, as illustrated in FIG. 13, opposite ends 160 of the grommet 158 can extend beyond opposite ends 162 of the hollow collar 156. One end 160 of the grommet 158 can accordingly be sandwiched between a washer 164 and the hollow collar 156 such that the grommet 158 and the washer 164 are in contacting engagement. The other end 160 of the grommet 158 can be sandwiched between the hollow collar 156 and the lower end 152 of the conduit bracket 148 such that the lower end 152 and the grommet 158 are in contacting engagement. In one embodiment, the grommet 158 can comprise an elastomeric material. As such, the grommet 158 can permit movement of the exhaust system 136 relative to the sub-frame 52 which can alleviate some of the vibratory stresses conventionally imparted with attachment of a conduit to an exhaust port and a muffler.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art.

What is claimed is:

1. A vehicle comprising:
a frame comprising:
a main frame; and
a sub-frame movably attached to the main frame, the sub-frame comprising an exhaust bracket that comprises a hollow collar;
an engine comprising an engine casing and an exhaust port, the engine being releasably attached to the sub-frame; and
an exhaust system comprising:
a conduit comprising an upstream end and a downstream end, the upstream end being connected to the exhaust port;
a conduit bracket comprising a first end and a second end, the first end being attached to the conduit at a location intermediate the upstream end of the conduit and the downstream end of the conduit, the second end of the conduit bracket being movably attached to the hollow collar; and
a muffler attached to the downstream end of the conduit.

2. The vehicle of claim 1 wherein:
the exhaust bracket further comprises a grommet;
the hollow collar receives the grommet;
the hollow collar is in contacting engagement with the grommet;
the grommet extends beyond at least one end of the hollow collar; and
the grommet permits movement of the conduit bracket relative to the sub-frame.

3. The vehicle of claim 2 wherein the grommet extends beyond opposite ends of the hollow collar.

4. The vehicle of claim 3 further comprising a bolt and a nut, wherein the bolt extends through the grommet and the nut is threaded onto the bolt to facilitate securement of the second end of the conduit bracket to the hollow collar.

5. The vehicle of claim 4 further comprising a pair of washers, wherein one of the washers is sandwiched between the grommet and the bolt, and the other of the washers is sandwiched between the grommet and the nut.

6. The vehicle of claim 2 wherein the grommet is formed from an elastomeric material.

7. The vehicle of claim 1 wherein the sub-frame is permitted to move relative to the main frame in three mutually orthogonal directions.

8. A vehicle comprising:
a frame comprising:
a main frame; and
a sub-frame movably attached to the main frame and movable relative to the main frame in three mutually orthogonal directions, the sub-frame comprising an exhaust bracket that comprises a hollow collar;
an engine comprising:
an engine casing comprising a first mount lug and a second mount lug, each of the first mount lug and the second mount lug being releasably fastened to the sub-frame; and
an exhaust port; and
an exhaust system comprising:
a conduit comprising an upstream end and a downstream end, the upstream end being connected to the exhaust port;
a conduit bracket comprising a first end and a second end, the first end being attached to the conduit at a location intermediate the upstream end of the conduit and the downstream end of the conduit, the second end of the conduit bracket being movably attached to the hollow collar to permit movement of the conduit bracket relative to the sub-frame; and
a muffler attached to the downstream end of the conduit.

9. The vehicle of claim 8, wherein:
the sub-frame further comprises a first bracket and a second bracket;
the first mount lug of the engine casing is attached to the first bracket; and
the second mount lug of the engine casing is attached to the second bracket of the sub-frame.

10. The vehicle of claim 9, wherein:
each of the first mount lug of the engine casing and the second mount lug of the engine casing is hollow and comprises a first end and a second end;
the engine further comprises a first pair of mount collars and a second pair of mount collars;

a first one of the first pair of mount collars is inserted into the first end of the first mount lug;

the second one of the first pair of mount collars is inserted into the second end of the first mount lug;

a first one of the second pair of mount collars is inserted into the first end of the second mount lug; and the second one of the second pair of mount collars is inserted into the second end of the second mount lug.

11. The vehicle of claim 10 wherein:

the exhaust bracket further comprises a grommet;

the hollow collar receives the grommet;

the hollow collar is in contacting engagement with the grommet;

the grommet extends beyond at least one end of the hollow collar; and the grommet permits movement of the conduit bracket relative to the sub-frame.

12. The vehicle of claim 11 wherein the grommet extends beyond opposite ends of the hollow collar.

13. The vehicle of claim 12 further comprising a bolt and a nut, wherein the bolt extends through the grommet and the nut is threaded onto the bolt to facilitate securement of the second end of the conduit bracket to the hollow collar.

14. The vehicle of claim 13 further comprising a pair of washers, wherein one of the washers is sandwiched between the grommet and the bolt, and the other of the washers is sandwiched between the grommet and the nut.

15. The vehicle of claim 11 wherein the grommet is formed from an elastomeric material.

16. The vehicle of claim 8 wherein the sub-frame further comprises a tubular member that is substantially U-shaped.

17. The vehicle of claim 8 wherein:

the exhaust bracket further comprises a grommet;

the hollow collar receives the grommet;

the hollow collar is in contacting engagement with the grommet;

the grommet extends beyond at least one end of the hollow collar; and the grommet permits movement of the conduit bracket relative to the sub-frame.

18. The vehicle of claim 17 wherein the grommet extends beyond opposite ends of the hollow collar.

19. The vehicle of claim 18 further comprising a bolt and a nut, wherein the bolt extends through the grommet and the nut is threaded onto the bolt to facilitate securement of the second end of the conduit bracket to the hollow collar.

20. The vehicle of claim 19 further comprising a pair of washers, wherein one of the washers is sandwiched between the grommet and the bolt, and the other of the washers is sandwiched between the grommet and the nut.

* * * * *